Dec. 26, 1950        F. H. OWENS        2,535,514
INTERMITTENT GRIP POSITIONING
APPARATUS FOR CONTROL CAMS

Filed Dec. 2, 1947                4 Sheets-Sheet 1

INVENTOR
FREEMAN H. OWENS

*James and Franklin*
ATTORNEY

Dec. 26, 1950  F. H. OWENS  2,535,514
INTERMITTENT GRIP POSITIONING
APPARATUS FOR CONTROL CAMS

Filed Dec. 2, 1947  4 Sheets-Sheet 2

INVENTOR
FREEMAN H. OWENS
BY
ATTORNEY

Dec. 26, 1950

F. H. OWENS 2,535,514

INTERMITTENT GRIP POSITIONING APPARATUS FOR CONTROL CAMS

Filed Dec. 2, 1947

INVENTOR
FREEMAN H. OWENS
BY
*James and Franklin*
ATTORNEY

Dec. 26, 1950  F. H. OWENS  2,535,514
INTERMITTENT GRIP POSITIONING
APPARATUS FOR CONTROL CAMS
Filed Dec. 2, 1947  4 Sheets-Sheet 4

INVENTOR
FREEMAN H. OWENS
BY James and Franklin
ATTORNEY

Patented Dec. 26, 1950

2,535,514

UNITED STATES PATENT OFFICE 2,535,514

INTERMITTENT GRIP POSITIONING APPARATUS FOR CONTROL CAMS

Freeman H. Owens, New York, N. Y.

Application December 2, 1947, Serial No. 789,193

6 Claims. (Cl. 74—111)

1

The present invention relates to apparatus for positioning a control cam in response to the difference between two stimuli.

This application is a continuation in part of application, Serial No. 762,949, filed July 23, 1947, by the present inventor and entitled "Control Cam and Apparatus for Positioning the Same."

It is often necessary, in connection with various types of apparatus, that a control cam or other control mechanism be positioned or actuated in accordance with the incidence of two separate factors and more specifically in accordance with the difference between said two factors. For example, in coin-operated amusement devices, such as record players, the two factors involved are the number and denomination of coins inserted into the apparatus and the number of records played in response thereto. Thus, if each record reproduction costs five cents, the mechanism controlling the operation of the record player must be responsive to the number of five cent units deposited in the machine and to the number of records reproduced in response thereto, so that the same number of records will be reproduced as are paid for and so that a number of five cent pieces or their equivalents may be inserted into the machine at one time and without waiting for the reproduction of each record. In other words, the mechanism controlling the operation of such a record player must have a memory. It must remember the number of five cent units deposited in it and it must remember the number of records played in response thereto to the end that, once these two quantities have become equal, functioning of the record player will terminate.

In many other types of apparatus, such as for example those used for the reproduction of a given number of copies of certain pieces of intelligence, it may be desirable to manually preset the control cam so that it will turn off the apparatus after the desired number of copies have been reproduced. It is also desirable in such apparatus, should there be a change as to the desired number of copies during the reproduction operation, that the control cam can be manually reset during the reproduction cycle.

In the past, various arrangements have been devised to accomplish this result, the most common of which is to employ a ratchet wheel which is either manually preset or actuated according to the number of money units deposited in the machine, the ratchet wheel rotating a shaft against the tension of a coiled spring. As each record is played, the ratchet wheel is released to move back one step, urged in that direction by the spring. This type of mechanism has proved itself subject to the extremely serious defect that it is not positive in operation, nor is it dependable after a period of use. Since the tension of the spring is greatest when a large number of money units have been deposited in the machine, such an apparatus has a tendency, when a large number of coins are involved, to rotate in the reverse direction so rapidly and with such force as to move more than one step at a time. This results in the reproduction of a fewer number of records than have been paid for, a fact keenly resented by the users of such machines. Moreover, after the spring has been flexed and unflexed for a number of times, its resiliency tends to decrease, and it consequently happens that when it is substantially unwound, it may have insufficient force to rotate the ratchet wheel and consequently even though that wheel be released for rotation, the rotation will not take place. This results in the reproduction of more records than have been paid for, a fact keenly resented by the owners and operators of such apparatus.

In order to reduce the incidence of these defects, many expedients have been resorted to, all of them characterized by the fact that they require relatively complicated apparatus which is expensive, relatively difficult to maintain and relatively bulky.

It is the prime object of the present invention to devise an apparatus which will eliminate the above set forth defects and disadvantages of prior art apparatus.

It is yet another object of the present invention to devise a mechanism for rotating a control cam which is positive in operation, which has no parts subject to deterioration upon use, which is simple and compact in construction, and which is assembled of parts all of which are easily susceptible of mass production.

A further object of the present invention is to devise a mechanism contained within a casing having a manually operable means projecting from said casing through which the position of the control cam may be manually set before the apparatus which is controlled is set into operation and, in a more specific embodiment, in which the position of the control cam may be manually readjusted at will at any time and, if desired, in either direction.

It is still a further object to provide in conjunction with such an apparatus cooperating indicia on the casing and on the manually movable element which in part controls the position of the cam, the indicia indicating at all times the position of the cam and consequently the expected duraton of the operation of the controlled apparatus.

The present invention is here illustrated in a variety of forms, in one of which the apparatus is specifically applicable for use in a coin-controlled amusement apparatus such as a record reproducer, but the further disclosures in which the control mechanism may be manually preset rather than actuated in both directions by a pawl and ratchet arrangement make it apparent that the scope of usefulness and the inventive merit of the hereindisclosed apparatus is susceptible of wide use wherever it is desired to control an apparatus in accordance with the difference between two separate stimuli.

To the accomplishment of the foregoing objects and such other objects as may hereinafter appear, the present invention relates to a control cam and to apparatus for positioning the same as defined in the appended claims and as set forth in this specification, taken together with the accompanying drawings, in which:

Figure 7:
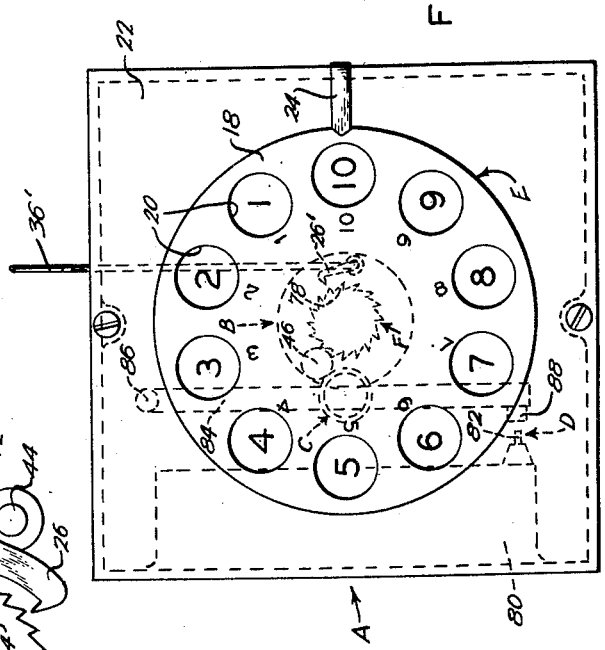
Fig. 7 is a schematic view of another embodiment of the present invention in which the pawl is actuated by an element outside of the casing.
Figure 8:
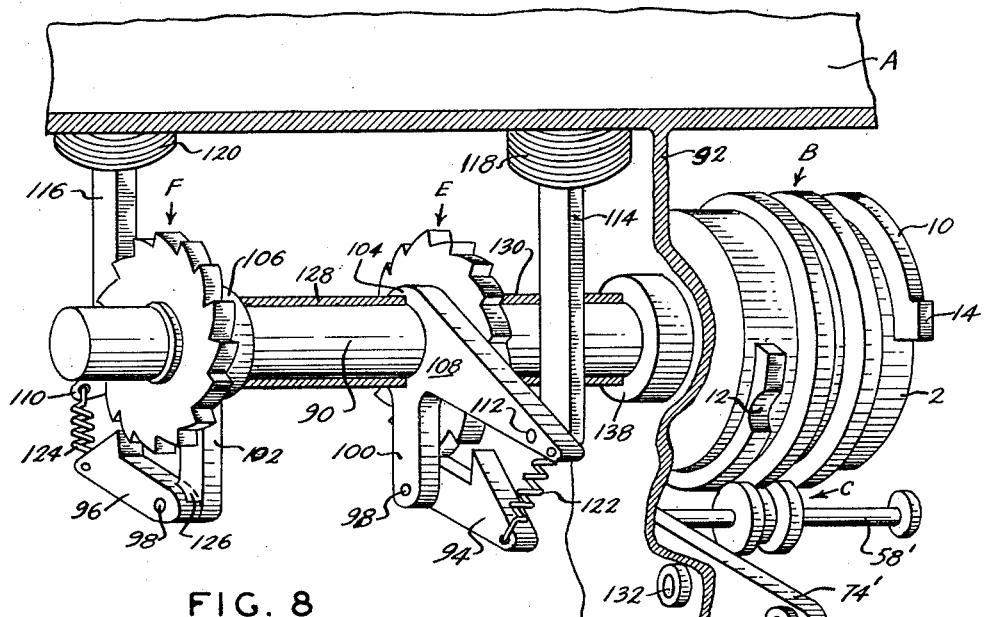
Figure 9:
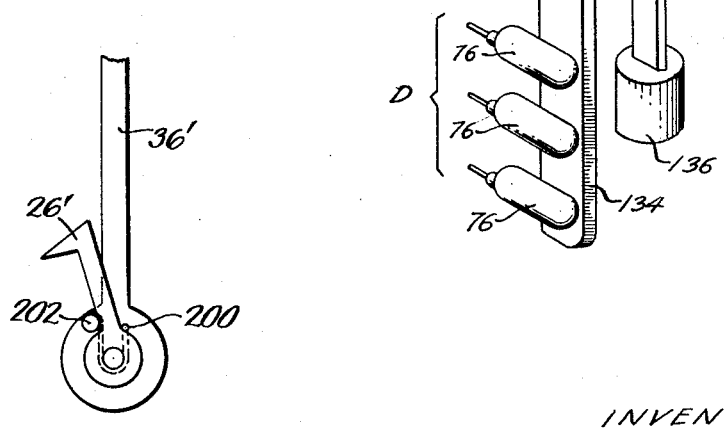

Fig. 8 discloses an embodiment of the present invention particularly adapted for use in a coin-controlled apparatus, the mechanism being shown in an idealized perspective view illustrating the general arrangement of parts of the mechanism for controlling the cam; and Fig. 9 is a detailed view on an enlarged scale of the rod and pawl construction of Fig. 7.

The apparatus of the present invention comprises, in broad outline, a casing generally designated A within which control cam generally designated B is rotatably mounted. A cam follower C is in contact with and follows the cam surface on the cam B and positions appropriate control mechanism generally designated D in accordance with said cam surface. Means generally designated E and F respectively are provided to positively rotate the cam B, one at least in one direction and the other in the opposite direction. In the embodiment of Figs. 1 through 7, the means E comprises a member which projects from the casing A and is manually manipulatable. In the case of the embodiment of Fig. 8, the means E comprises a pawl-actuated ratchet wheel. In all of the embodiments, the means F is illustrated in the form of a pawl actuated ratchet wheel. In the embodiment of Figs. 1 through 6 and Fig. 8, the means F is actuated via an appropriately controlled solenoid, whereas in the embodiment of Fig. 7, the means F may either be manually controlled or controlled by any type of linkage external of the casing A. In all the embodiments, the means F operates step by step and consequently is adapted to be controlled in accordance with the number of copies reproduced, the number of records played, etc. In the embodiment of Fig. 8, the means E is also actuated step by step and is therefore adapted to be controlled by the number of money units deposited in the record playing apparatus, while in the other embodiments the means E need not be operated step by step. From the construction it will become apparent that the position of the cam B and consequently that portion of the cam surface thereon in contact with the cam follower C, is determined by the cumulative action of both of the means E and F and, more specifically is determined by the difference between the amounts which the means E and F have caused the cam B to rotate, it being understood that when the means E is rotatable in two directions, that direction which moves the cam B from its position to shut off the controlled apparatus is considered positive in sense, and the opposite direction is considered negative in sense. Consequently, it may be said that the position of the cam B and consequently the action of the control means D is determined by the difference between two stimuli, one active on the cam B via the rotating means E and the other active thereupon via the rotating means F.

As here illustrated, the cam B comprises a wheel 2 rotatable on shaft 4 mounted in bearing 6 which projects from the back 8 of the casing A. The cam B bears on its periphery a spiral cam track 10 which is here illustrated as being so shaped as to have several consecutive turns of equal height, a depression 12 at one end thereof (see Fig. 8), and a stop 14 at the other end thereof. Switch bracket 16 is movably mounted within the casing A and is operatively connected to the cam follower C by means of a linkage subsequently to be described so that the position of the switch bracket 16 is controlled by the position of the cam follower C which is in turn controlled by the cam surface 10.

Figure 2:
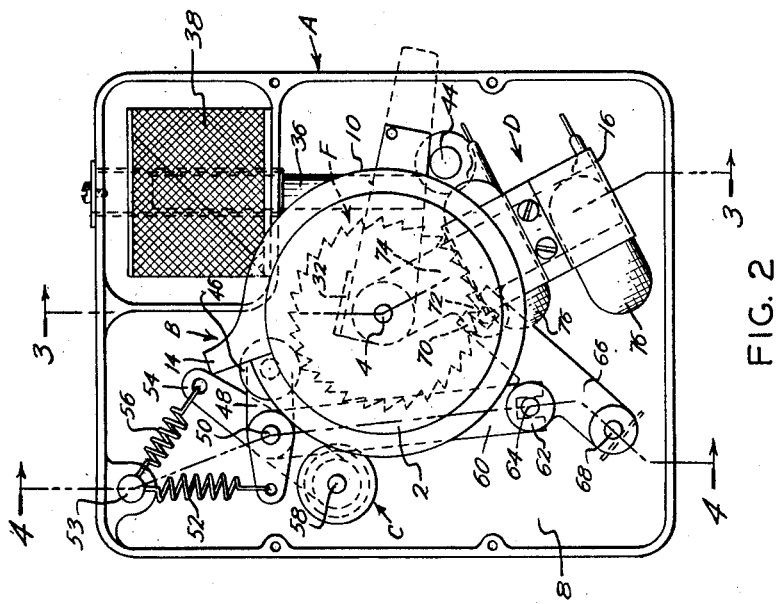
Fig. 2 is similar to Fig. 1 but with the cover removed.
Figure 1:
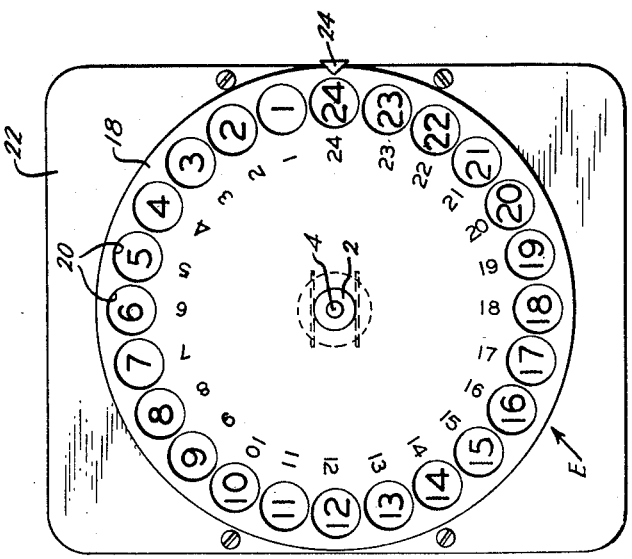
Fig. 1 is a front view of the apparatus with the cover on the casing.
Figure 3:
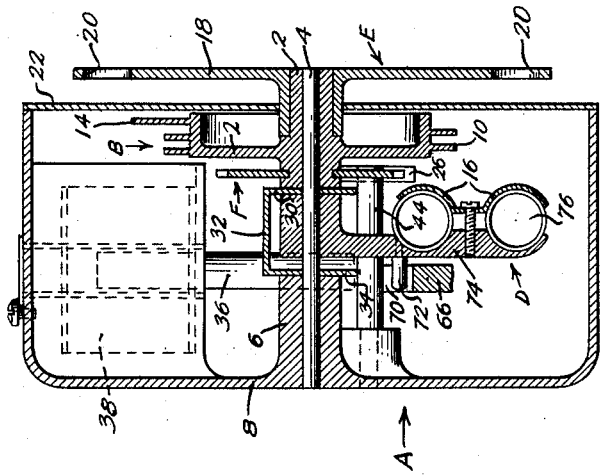
Fig. 3 is a side cross-sectional view taken along the line 3—3 of Fig. 2.
Figure 4:
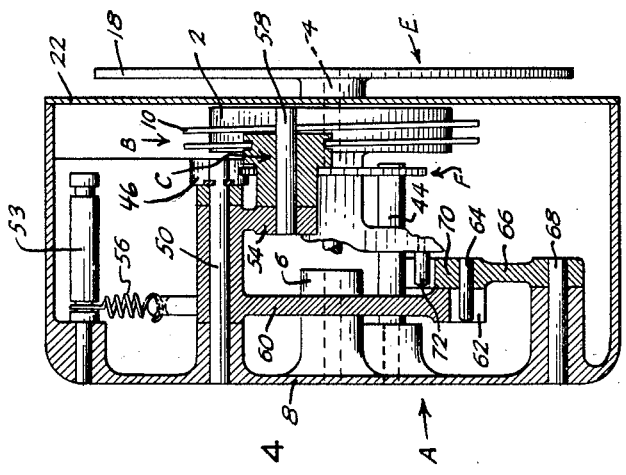
Fig. 4 is a side cross-sectional view taken along the line 4—4 of Fig. 2 and also showing the cam follower and its mounting in cross-section.
Figure 5:
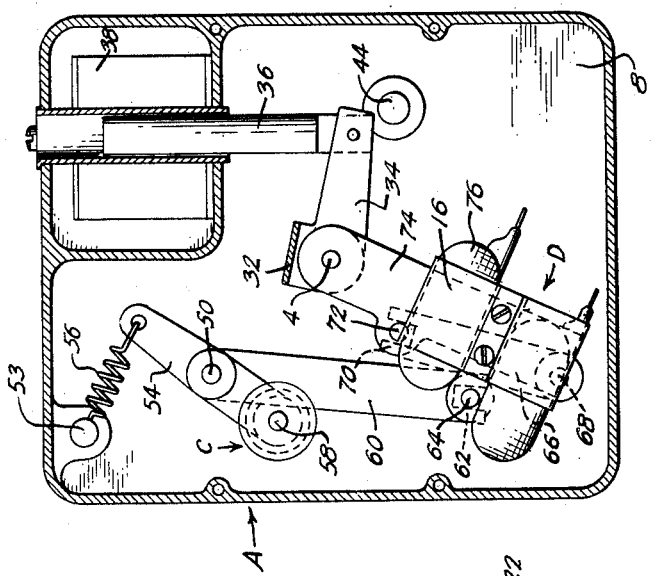
Fig. 5 is a view similar to Fig. 2 but with some of the uppermost mechanism removed and showing the apparatus in a different control position from that of Fig. 2.

The cam wheel 2 projects out through the front of the casing A and to it the manually operable means E is attached. This means may take the form of any manually manipulatable member and is here specifically illustrated in Figs. 1, 3, 4 and 7 as a disc 18 provided near its periphery with a plurality of apertures 20 spaced in a manner subsequently to be described. For ease in manipulation, it is preferred, as illustrated in Figs. 1 and 7, that each of these apertures be serially numbered and that the front cover 22 of the casing A be provided with cooperating numbers visible through and registering with the apertures 20. An index mark 24 attached to the casing A and registrable with the apertures 20 is also desirable.

Figure 6:
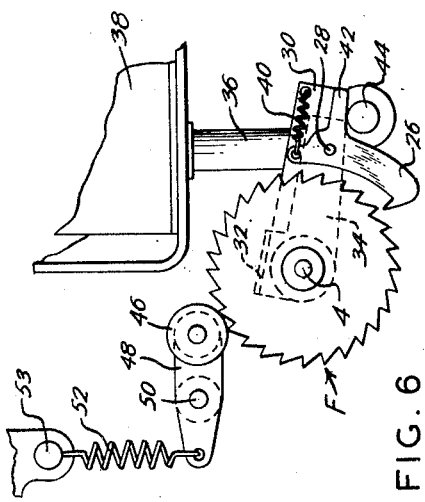
Fig. 6 is a detailed view on an enlarged scale showing the ratchet wheel, the detent mechanism active thereupon and the pawl and stop construction.

Also operatively connected to the cam B inside the casing A is the ratchet wheel F which is adapted to be engaged and rotated by means of pawl 26 (see Fig. 6). This pawl is pivotally mounted on pin 28 fastened to arm 30 freely pivotable about shaft 4 and connected by means of bridge 32 with arm 34 which is in turn fastened to armature 36 of solenoid 38 contained within the casing A. A spring 40 is active upon the pawl 26 so as to urge it into engagement with the teeth of ratchet wheel F. The pawl is provided with an extension 42 and a pin 44 extends inwardly from the back 8 of the casing A so as to intercept and engage the extension 42 of pawl 26 and the arm 30 in order to limit their motion in a downward direction as viewed in Figs. 3, 5 and 6. When the pin 44 thus engages the extension 42 on the pawl 26, it has the further effect of rotating the pawl 26 against the action of the spring 40 so as to cause it to become disengaged from the ratchet wheel F. This disengagement is an important factor in the present invention since it permits the free manual positioning of the cam B at any time except while the pawl 26 is actively engaged in moving the ratchet wheel F.

In order to ensure accurate positioning of the cam B and in order further to ensure regular step by step motion on the part of the ratchet means F, detenting mechanism may be provided. As here illustrated, such mechanism takes the form of a roller 46 mounted on lever 48 which is pivotally mounted on pin 50 and urged by spring 52, the other end of which is secured to pin 53, into yielding engagement with the teeth of the ratchet wheel F, the roller 46 tending to take up a position between any two adjacent teeth of the ratchet wheel F so as to releasably fix its position.

The cam follower C is here shown in the form of a roller mounted on cam lever 54 also rotatable about pin 50 and urged by means of spring 56, the other end of which is secured to pin 53, so that the cam follower C makes contact with the cam surface 10. When the cam surface is, as here disclosed, of helical form, the cam follower C must itself be slidable along as well as rotatable over the mounting pin 58 therefor at the extremity of lever 54. The lever 54 may be integrally formed with or otherwise operatively connected to arm 60, the slotted extremity 62 of which receives pin 64 attached to intermediate lever 66 which is in turn pivotally mounted about pin 68. The upper extremity 70 of the intermediate lever 66 is slotted so as to receive pin 72 fastened to arm 74 which may be pivotally mounted about shaft 4 and which carries the switch bracket 16 which may contain one or more mercury switches 76.

By means of the linkage above described, it will be apparent that when the cam follower C is located in the depression 12 in the cam surface 10 (see Fig. 2), the arm 74 and the switch bracket 16 will be rotated to a position in which the switches 76 are in open circuit position. However, if the cam B be rotated so as to bring the cam follower C upon the cam surface proper 10, which is elevated above the depression 12, the cam follower C will be rotated outwardly (see Fig. 5) and the switch bracket 16 and the mercury switches 76 carried thereby will thus be moved to closed circuit position. These switches may control whatever apparatus is desired.

The embodiment illustrated in Fig. 7 differs from that of Figs. 1 through 6 primarily in that instead of an armature 36 controlled by a solenoid 38, a wire rod 36' is substituted therefor and projects outside of the casing A. This rod may either be manipulated manually or controlled by any suitable mechanism. The pawl 26' is directly attached to the rod 36' and is spring urged in any conventional manner, as by the spring 200, so as to rotate in a counterclockwise direction as viewed in Figs. 7 and 9, a suitable stop 202 being provided on the rod 36' to ensure that the pawl 26' be normally disengaged from the ratchet wheel F. As disclosed in Fig. 7, it is necessary, in order to rotate the ratchet wheel F one step and thus rotate the cam B to a similar or corresponding degree, that the rod 36' first be depressed so as to carry the tip of pawl 26' past the ratchet teeth designated 78 and then raised, the pawl thereby moving the ratchet wheel F.

Fig. 7 also differs from the previously described figures in that instead of employing mercury switches 76, a snap acting switch 80 is employed, this switch being shown as enclosed in a casing from which the switch actuating member 82 projects. The cam follower C is rotatably mounted intermediate of arm 84 which is rotatably mounted at one extremity at 86 and provided near its other extremity with a member 88 engageable with the switch actuating member 82 so as to close the switch 80 whenever the cam follower C is on a raised portion of the cam surface.

In the embodiment illustrated in Fig. 8, an apparatus is disclosed which is particularly useful in coin-operated mechanisms. A somewhat different arrangement of parts is also shown. The control cam B is mounted on shaft 90 which pierces an inner wall 92 of the casing A which may, for example, be the casing of an automatic coin-controlled record reproducer. Mounted fast on the shaft 90 are a pair of ratchet wheels E and F, each comprising one of the moving means for the cam B and each having ratchet teeth disposed in opposite directions. Pawls 94 and 96 are positioned so as to normally be out of engagement with the teeth on ratchet wheels E and F respectively, but movable into engagement therewith so as to rotate each of the ratchet wheels a given distance, preferably the distance represented by a single tooth.

Each of the pawls is pivotally mounted by means of pin 98 on mounting arms 100 and 102 respectively, each of these arms in turn being fastened to and preferably integral with collars 104 and 106 rotatable on the shaft 90. Operating arms 108 and 110 project from collars 104 and 106 and are in turn pivotally connected, by means of pins 112, to connector arms 114 and 116 respectively, these connector arms in turn constituting armatures for the solenoids 118 and 120. Springs 122 and 124 spring load the pawls 94 and 96, and stops 126 are provided on the mounting arms 100 and 102 to limit the pivotal motion of the pawls 94 and 96 in response to the tension of springs 122 and 124. Sleeves 128 and 130 are provided for spacing purposes.

The cam follower C is rotatably and slidably mounted on pin 58' which is attached to one end of arm 74' pivotally mounted on pin 132. The mercury switches 76 are attached to arm 134 depending from the arm 74' and a weight 136 is attached to an end of the arm 74' so as to bias the cam follower C into contact with the cam surface 10.

In this embodiment, no detenting means is provided in order to prevent overrunning of the shaft 90 when it is urged in rotation in either direction. The bearing 138 in the wall 92 through which the shaft passes may frictionally engage the shaft to a degree sufficient to prevent overrunning, but, of course, not to such a degree as to prevent rotation of the shaft when urged by engagement of a pawl and ratchet.

The operation of the cam positioning mechanisms above described will in the main be apparent. In the embodiments of Figs. 1 through 7, if it be desired for example that ten reproductions be made, the manually operable member E is rotated until the cam B is appropriately positioned. This may be accomplished by inserting a finger in the aperture 20 through which the number 10 on the front cover 22 of the casing A is visible and moving that aperture in a clockwise direction until it comes opposite the index mark 24. This will rotate the cam so as to move the cam follower C to the position illustrated in Fig. 5, thus tilting the mercury switches 16 to closed circuit position and initiating the operation of the mechanism controlled. At the end of each cycle of that mechanism, that is to say, after each unit is reproduced, the solenoid 38 will be energized, causing the armature 36 to be pulled up, thus moving the pawl 26 into engagement with the teeth of the ratchet wheel F and positively moving that ratchet wheel a given degree. According to the design employed, this degree may correspond to a single tooth or to a plurality of teeth. Such a rotation of the ratchet wheel F will cause the cam B to rotate in a direction opposite to that in which it was initially rotated by the manually operable means E, that is to say, in a counter-clockwise direction as viewed in Figs. 1 and 2. The manually operable means E will move in the same direction and is connected to the cam B so that its motion corresponds to the spacing between the apertures 20. Consequently, after a single actuation of the solenoid 38, the aperture 20 corresponding to the number 10 on the dial will no longer be opposite the index mark 24. Instead, the aperture corresponding to the number 9 on the dial will be opposite that index mark, indicating to the operator that 9 more reproductions will take place. This sequence continues until the energization of the solenoid 38 rotates the cam to its position illustrated in Fig. 2 in which the cam follower C falls into the depression 12 in the cam surface 10. When this occurs, the linkages in the casing A will take up their position illustrated in Fig. 2 and the circuit will be opened through the mercury switches 16, thus stopping operation of the mechanism controlled.

Because the pawl 26 is at all times disengaged from the ratchet wheel F (except for the time it is actually moving the same), the manually operable means E may be rotated in either direction at any time so as to vary the number of reproductions. Thus, if after only five reproductions have taken place, it be desired to stop the apparatus, the dial 18 need only be manually rotated to its position shown in Fig. 1. The only resistance to this rotation will be offered by the yielding detent wheel 46. If it be desired at any time to increase the number of reproductions after the initial presetting of the dial 18, it is necessary only to rotate that dial in a clockwise direction to any desired degree.

When a spiral cam is employed, the dial 18 may be rotated over more than a full revolution with a corresponding increase in the number of reproductions which will take place before the apparatus being controlled is brought to a stop.

In the embodiment illustrated in Fig. 8, no provision is specifically made for manually setting the position of the cam B, although, since both pawls 94 and 96 are normally disengaged from their respective ratchet wheels E and F, the cam could be made manually positionable if desired. Each of the solenoids 118 and 120 are made responsive in any conventional manner to the stimuli which are to control the operation of the apparatus. Thus, solenoid 120 may be responsive to the number of records reproduced in a coin-controlled record player and solenoid 118 may be responsive to the number of money units deposited in the apparatus. The means by which this may be accomplished are many and varied, well known in the art, and form no part of the present invention. Insofar as the disclosed structure is concerned, it is necessary only that for each money unit deposited in the apparatus, the solenoid 118 be given a separate and distinct energizing impulse. Each one of these impulses will cause the armature 114 to be drawn within the solenoid 118, thus raising the arm 108 so as to cause the pawl 94 to engage with the tooth of ratchet wheel E so as to rotate that wheel one step, preferably the amount of separation between adjacent teeth, in a counter-clockwise direction as viewed from the left-hand end of shaft 90. This will rotate the shaft 90 a similar amount and, since the pawl 94 is disengaged from the ratchet wheel F, this rotation is permitted. The cam B is similarly rotated.

As each record is played, the solenoid 120 may be energized by any appropriate means and each energization thereof will result in the rotation of ratchet wheel F, and consequently of the shaft 90 and the cam B in a clockwise direction for a single step. If the steps of rotation brought about by energization of the solenoid 120 are equal in magnitude to the steps of rotation brought about by energization of solenoid 118, then the solenoid 120 will have to be energized just as many times as the solenoid 118 has previously been energized in order to bring the cam B back to its initial reproduction-stopping position. It will of course be apparent that if the size of rotational steps caused by energization of either one of the solenoids differs from that caused by energization of the other, a different relationship will ensue. For example, should the tooth spacing on the ratchet wheel F be double that of the tooth spacing on the ratchet wheel E, then each energization of the solenoid 120 will cancel out two energizations of the solenoid 118. Such an arrangement would be appropriate if the solenoid 118 were to be energized upon the insertion of five cent units in the apparatus but if each record to be reproduced were to cost ten cents. The flexibility of the above-described apparatus will be apparent from the above examples which are set forth by way of exemplification only.

The control mechanism and actuating mechanism herein disclosed present, as the previous discussion has pointed out, many disadvantages over the prior art. Insofar as the operating mechanism is concerned, it may be operated in one direction either manually or by means of a solenoid or other operation mechanism either in a step by step or in a relatively continuous manner. It may be operated in the other direction either manually, to cancel out previously set stimuli, or step by step in response to each cycle of the apparatus being controlled. The mechanism is composed of a plurality of simple and easily fabricated parts which are in turn easily assemblable into an exceedingly small space and it eliminates the employment of any units such as springs, the life and dependability of which are low and inconstant, for direct action on the rotating parts. The apparatus is positively driven in both directions, this being accomplished by keeping the pawls disengaged from their respective ratchet wheels during normal functioning, engagement being accomplished only during the short period of time when the pawl is actually moving its ratchet wheel. By suitable design of ratchet wheel, any desired relationship between the two stimuli relied upon to control the apparatus may be achieved without in any way increasing the complexity, cost of size of the apparatus. In this flexibility of operation alone, it represents a considerable advance over devices in common use.

In one of its preferred forms, the apparatus may be entirely self-contained within a casing, only a manually operable member projecting therefrom. In such an embodiment the manually operable member and the casing may be provided with indicia to faciiltate presetting the cam for a desired number of reproductions and further to facilitate readjustment of the position of the cam at will during the operation of the device.

While only a limited number of embodiments of the present invention have been here illustrated and described, the principles of operation thereof will be apparent and it will be clear that many variations may be made in its specific design without departing from the spirit of the invention as defined in the appended claims.

I claim:

1. In combination, a casing, a shaft mounted therein, a cam wheel rotatably mounted on said shaft, a ratchet wheel fixed to said cam wheel for rotation therewith, a pawl engageable with said ratchet wheel for rotating the same, a supporting member for said pawl pivotable about said shaft, said pawl being pivotally mounted on said supporting member, a spring active on said pawl to urge it into engagement with said ratchet wheel, a projection on said pawl, a movable member operatively connected to said pawl and the supporting member therefor active to move said pawl between two extreme positions of travel, a stop in said casing engageable with the projection on said pawl when said pawl is in one of its extreme positions and simultaneously engageable with the supporting member therefor effective to limit the position of said pawl and said supporting member and to disengage said pawl from said ratchet wheel against the action of said spring, a cam follower and control mechanism actuated by said cam follower, said cam wheel projecting from said casing and having a manually operable member attached thereto.

2. In the combination of claim 1, a spring loaded detent active upon said ratchet wheel to retain the same in a given position.

3. In the combination of claim 1, a solenoid and an armature therefor, said armature defining the movable member operatively connected to said pawl, the position of said armature when said solenoid is deenergized being limited by engagement of said pawl and said supporting member therefor with said stop, energization of said solenoid moving said armature to its other extreme position so as to permit engagement of said pawl with said ratchet wheel to rotate said ratchet wheel a predetermined amount.

4. In combination, a casing, a cam wheel rotatably mounted therein, a ratchet wheel operatively connected to said cam wheel for rotation therewith, a pawl engageable with said ratchet wheel for rotating the same, a supporting member for said pawl articulately mounted in said casing, said pawl being articulately mounted on said supporting member, a spring active to urge said pawl into engagement with said ratchet wheel, a movable member operatively connected to said pawl and the supporting member therefor active to move said pawl between two extreme positions of travel, a stop in said casing engageable with said pawl when said pawl is in one of its extreme positions and simultaneously effective to fix the position of said supporting member so as to limit the position of said pawl and said supporting member and to disengage said pawl from said ratchet wheel against the action of said spring, a cam follower and control mechanism actuated by said cam follower, and a manually operable member on the exterior of of said casing operatively connected to said cam wheel for rotating the same.

5. In combination, a casing, a ratchet wheel rotatably mounted therein, a pawl engageable with said ratchet wheel for rotating the same, a supporting member for said pawl articulately mounted in said casing, said pawl being articulately mounted on said supporting member, a spring active to urge said pawl into engagement with said ratchet wheel, a movable member operatively connected to said pawl and the supporting member therefor active to move said pawl between two extreme positions of travel, a stop in said casing engageable with said pawl when said pawl is in one of its extreme positions and simultaneously active upon said supporting member and effective to limit the position of said pawl and said supporting member and to disengage said pawl from said ratchet wheel against the action of said spring.

6. In combination, a casing, a cam wheel rotatably mounted therein, a ratchet wheel operatively connected to said cam wheel for rotation therewith, a pawl engageable with said ratchet wheel for rotating the same but normally disengaged therefrom, a movable member for moving said pawl into engagement with and rotating said ratchet wheel, a first arm pivotally mounted in said casing and bearing a cam follower adapted to engage said cam wheel, a spring active upon said first arm to urge said cam follower against said cam, a second arm pivotally mounted in said casing coaxial with said first arm, said second arm bearing a detent active upon said ratchet wheel to retain the same in a given position, a spring active upon said second arm to urge said detent into engagement with said ratchet wheel, a switch in said casing, and a linkage in said casing operatively connected between said switch and said cam follower, whereby said cam controls the actuation of said switch, and a manually operable member on the exterior of said casing operatively connected to said cam wheel for rotating the same.

FREEMAN H. OWENS.

REFERENCES CITED

The following references are of record in the file of this patent:

UNITED STATES PATENTS

| Number | Name | Date |
|---|---|---|
| 732,157 | Bedworth | June 30, 1903 |
| 739,066 | Doty | Sept. 15, 1903 |
| 1,928,742 | Sears | Oct. 3, 1933 |
| 2,428,569 | Hunt | Oct. 7, 1947 |